2,904,331
Patented Sept. 15, 1959

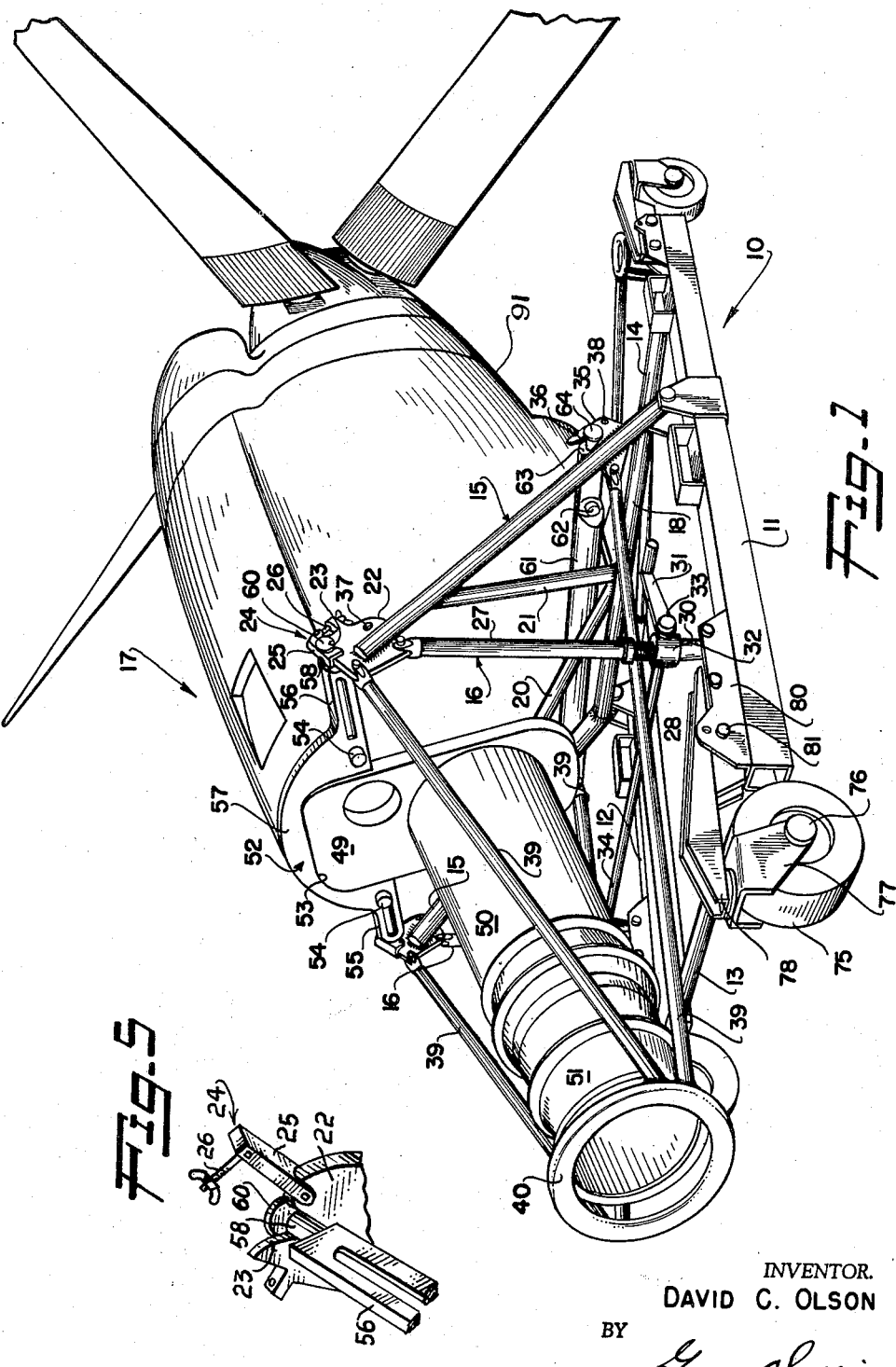

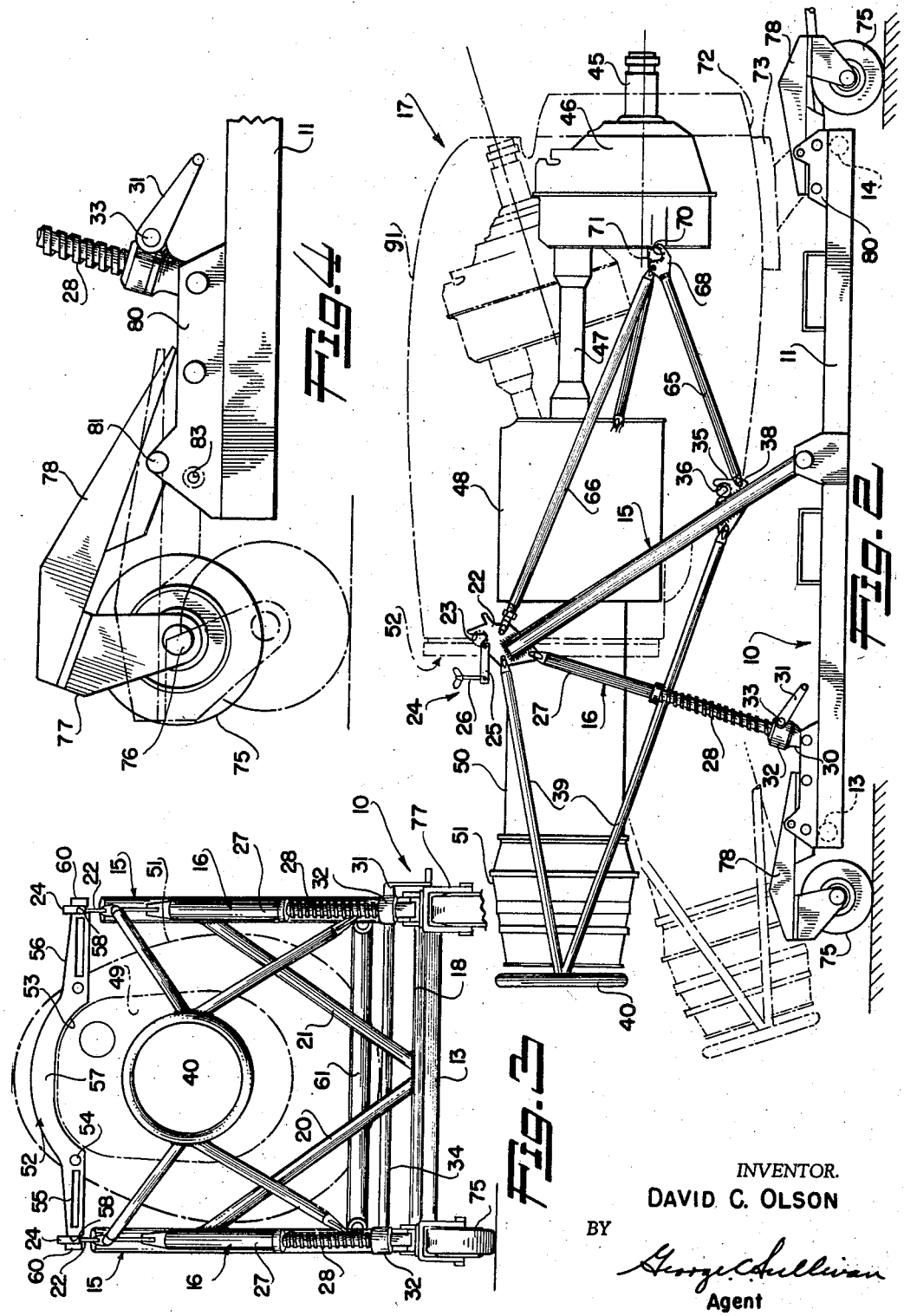

2,904,331

ENGINE WORKSTAND AND DOLLY

David C. Olson, Burbank, Calif., assignor to Lockheed Aircraft Corporation, Burbank, Calif.

Application May 5, 1958, Serial No. 733,043

11 Claims. (Cl. 269—136)

This invention relates to improvements in stands adapted to support a device such as an aircraft engine being built up, repaired, or for serving as a transportation dolly. More particularly, the present invention relates to a stand or dolly for a turbo-prop engine.

Difficulties have been encountered in the servicing and repairing of turbo-prop engines used to power airplanes which are largely due to the fact that there is not commercially available a suitable turbo-prop engine dolly which can accommodate an engine including its propeller which has been removed from the airplane. Most engine dollies commercially available are of a fixed nature wherein the propeller must be removed from the engine in order to properly mount the engine and transport the engine about. Furthermore, in those instances where the prior art dollies employ a pivoting arrangement for mounting the engine, the pivotal arrangement of braces and supports is not of sufficient strength to support the weight of a turbo-prop engine and generally lacks necessary guards and means for protecting the unsupported portions of the engine, such as the tailpipe and nozzle, from damage.

Accordingly, these difficulties are overcome by the present invention in which a turbo-prop engine stand or dolly is provided which includes a yoke secured to the engine which is readily mountable from the top of the dolly into receiving receptacles provided on a spaced pair of main pyramidical supports. The main supports are carried on a frame which further includes manual means for pivoting the main supports including the engine in such a manner as to lower the tailpipe of the engine and raise the nose so that the engine may be supported on the dolly while a propeller is attached to the engine. The present invention also includes means supported on the main brace means for protecting the tailpipe of a turbo-prop engine so that the tailpipe will not be inadvertently damaged by impact with the pavement or other nearby objects during normal handling operations.

Therefore, it is an object of my invention to provide a simple, durable and rigid stand to which a turbo-prop engine or the like may be rigidly secured so that the engine may be easily and quickly moved from one location to another and which may be pivoted about a transverse axis in order to accommodate engine build-up, repair or transportation of the engine with a mounted propeller.

It is another object of the present invention to provide means whereby the engine may be easily and quickly secured to the main support of the engine dolly in order to avoid accidental falling or striking the pavement. Features of the invention include means for rapid alignment of the engine with the stand by providing a minimum of attachment points or locations.

Another object of the present invention is to provide a wheeled turbo-prop engine dolly which is capable for use as an engine build-up stand or which may be employed as an engine transportation dolly. Normally when serving as a transportation dolly, the engine dolly must be adapted to transport the engine including the engine cowling panels while the dolly must be adaptable to support the engine without the cowling panels for build-up and repair operations.

Other objects of the invention and the various advantages and characteristics of the present engine workstand and dolly will be apparent from a consideration of the following detailed description when taken in connection with the accompanying drawings in which like numbers of reference denote corresponding parts throughout the several views; in which Figure 1 is a perspective view of an engine dolly incorporating the present invention including a conventional turbo-prop engine and propeller mounted thereon;

Figure 2 is a side elevational view of the present invention being used as an engine build-up or repair stand as shown in solid lines and as an engine transportation dolly as shown in broken lines;

Figure 3 is an end view of the invention as shown in Figure 2 in solid lines;

Figure 4 is an enlarged elevational view showing a wheeled arrangement which can be raised or lowered in order to transport the engine stand or allow the stand to rest on the pavement; and Figure 5 is an enlarged fragmentary perspective view of a portion of the stand of the present invention.

With reference to the drawings, the present invention is shown which comprises, in general, a base 10 composed of structural members 11 and 12 which are united to form a generally rectangular frame by rods 13 and 14. Members 11 and 12 may be designated conveniently as side members while rods 13 and 14 as end rods. The base 10 is shown as a skeleton frame without deck or flooring, but if desired, a deck or flooring may be provided.

The base 10 furnishes support for a pair of spaced and opposing substantially upright members 15 and 16 which are pivotally secured to each side member 11 and 12 respectively. The side member and the pair of associated upright members form a substantially pyramidical mounting for a turbo-prop engine represented by the general reference numeral 17.

Upright members 15, associated with each side member, are rigidly connected by a rod 18 which is suitably secured to each upright member such as by welding. To provide rigidity, a pair of braces 20 and 21 are welded at a point near the center of rod 18 which extend upward to be weldably secured near the end of each member 15 remote from its pivotal connection on the side member. As shown in Figure 3, the braces form a V shaped configuration.

The end of each member 15 opposite to its pivotal end connected to the side member is provided with a fixture 22 which is secured thereto by means of welding. Each fixture 22 is provided with a receptacle 23. Adjacent to each receptacle 23 there is provided a pivotally mounted latch assembly 24 which comprises a latch 25 and a bolt and nut arrangement 26. The function and purpose of receptacle 23 and the latch assembly 24 will be described later.

Members 16 associated with each side member of the base may be more precisely defined as a screw jack arrangement comprising a cylinder 27 into which a threaded screw 28 travels. Screw 28 is mounted in a member 30 which is pivotally carried on each of the side members such as side member 11 for example. Screw 28 is also arranged to be rotated by means of a handle 31 which is supported by a collar 32 by means of a pinion arrangement 33. Pinion arrangement 33 is rotatably associated with the threads on screw 28 so that screw 28 may be rotated upon rotation of handle 31. Pinion 33 couples both upright members 16 associated with side members 11 and 12 by means of rod 34 so that synchronization is achieved between the upright members.

Located between the center of upright members 15 and its end pivotally connected to the side members, there is provided a fixture 35 which is suitably welded to the member 15 which includes a receptacle 36. Fixture 35 is similar to fixture 22 wherein both fixtures are employed as engaging means for mounting the engine 17. Both fixtures are provided with mounting apertures 37 and 38 for securing additional structural support members when the stand is employed for build-up or repair purposes without the engine cowling as will be described later.

Secured to fixtures 22 and 35, there is provided an engine protection device which comprises at least four rods 39 pivotally connected to the fixtures and converging to terminate at a common ring 40. The length of the four supporting protecting rods is determined by the length of the engine 17 to be mounted on the stand. The rods are arranged so that the ends of rods 39 opposite to their ends pivotally connected to the fixtures substantially meet at the ring 40 and are welded thereto to form a rigid protection means.

With reference to Figure 2, engine 17 may be defined as having a propeller shaft 45, a gear-box 46, a driveshaft 47 which leads from a combustion and compressor chamber 48, which, in turn, is coupled to a tailpipe 50 having an exhaust nozzle 51. Adjacent the connection of combustion and compressor chamber 48 with the tailpipe 50, there is usually provided on such an engine a fire shield 49 and an engine cowling 91 comprised of a plurality of panels. It is conventional practice in the design and construction of such engines to provide mounting holes or in some cases mounting pins on the engine which serve as key alignment points and mounting points for resting the engine on a dolly. As shown more clearly in Figure 1, the present invention incorporates a yoke member 52 which is provided with a cavity 53 which is adapted to receive the fire wall 49. The yoke is further provided with fasteners 54 for securing the yoke to the engine mounting points about the fire shield. It is to be understood that any suitable attaching means can be employed depending upon the type of fitting provided on the engine by its manufacturer.

Yoke 52 is provided with a pair of arms 55 and 56 extending out from a rounded central portion 57 of the yoke wherein each arm has a slot 58 provided therein which forms an annular flange 60. Each slot 58 is adapted to be inserted and received within the receptacle 23 provided on each fixture 22 so that the flange 60 remains on the outside of the fixture, see Fig. 5. Latch assembly 24 may be employed to suitably secure the yoke arms into position within their respective receptacles 23 on fixture 22.

In addition to the provision of a yoke 52, the present invention provides a mounting bar 61 which is secured to the engine 17 by suitable fasteners 62 such as provided for securing the yoke 52. The opposite ends of bar 61 are provided with annular slots 63 defining an annular flange 64 in a manner similar to the slot and flange provided on the opposite ends of the yoke 52.

As shown in Figure 2, the engine 17 is mounted on the dolly with the engine cowling 91 removed. Inasmuch as the cowling offers certain reinforcing and structural support for the engine while it is mounted on the dolly, a pair of rods 65 and 66 are attached on one end to apertures 37 and 38 of fixtures 22 and 35 respectively. The ends of these rods opposite to the ends connected to the fixtures converge to join at a fixture 68 having a suitable receptacle 70 for receiving an engine mounting pin 71 normally carried on the engine as provided by the engine manufacturer. Rods 65 and 66, together with the member 15, thus form rigid triangular support structures which function to support and balance the engine when the cowling is removed. It is understood that rods 65 and 66 are duplicated on the other side of the engine and are connected with fixtures and upright supporting members associated with side member 12. Inclusion of these rods in the basic stand construction makes it possible to employ the stand as an engine repair or build-up stand. At such time when the cowling is replaced about the engine construction, these rods may be removed and the nose 72 of the cowling may be rested against a pad 73 detachably carried on end rod 14. However, when the screw and jack arrangement is actuated by means of handle 31 and upright supports 16 are reduced in longitudinal dimension thereby, the engine is pivoted or rotated about the connections between upright sections 15 and their respective side members so that the weight and position of the engine is readjusted and the cowling nose pad is unnecessary.

In Figure 4, a wheeled arrangement is shown which is duplicated on all four corners of the rectangular frame or base of the stand. Each arrangement comprises a rotatable wheel 75 carried on an axle 76 which is supported by means of an extension 77 pivotally connected to a member 78 to provide a caster arrangement. Member 78 is pivotally carried on a mounting 80 by means of a pivot rod 81 which passes through the mounting and a portion of member 78. In this manner, member 78 may be said to cantilever over the periphery of the stand frame. In order to lower the wheels so that the stand may be transported from location to another, it is necessary to remove pivot pin 81 and adjust member 78 so that pin 81 may be inserted through an aperture 83 provided in mounting 80 and in turn, through mounting 78 so that the member will not pivot.

Features reside in the present invention which include the ease by which the engine 17 can be mounted on the engine dolly without encountering time consuming alignment problems. Usually, the engine is removed from the airplane and is suspended by a hoist. At this time, yoke 52 and bar 61 may be secured to the engine by fasteners 54 and 62. The engine dolly 10 is rolled into position under the engine and hoist is actuated to lower the engine so that slots 58 and 63 are received into receptacles 23 and 36 of fixtures 22 and 35 respectively. Upon disconnection of the hoist from the engine, the engine is totally supported on the truncated pyramidal construction of upright members 15 and 16 and side member 11 and 12. Latch assembly 24 is arranged to lock the yoke onto fixtures 22. The angle to be assumed by the engine is determined by the jack and screw arrangement as actuated by handle 31.

Having described only a typical form of the invention I do not wish to be limited to the specific details herein set forth, but wish to reserve to myself any variations or modifications that may appear to those skilled in the art and fall within the scope of the following claims.

I claim:

1. A stand for supporting an engine comprising, in combination, a base frame, a pair of upright engine supports disposed in spaced opposed relation and secured to said frame each upright engine support including a rigid member pivotally secured at one end to the frame and an adjustable member pivotally secured at one end to the frame in fixed spaced relationship to the pivotal connection of the rigid member to said frame, said rigid member and said adjustable member pivotally associated at a point above the pivotal connections of said members to said frame, engine mounting receptacles connected to said rigid members, there being at least one engine mounting receptacle rigidly connected to one of said rigid members, and at least two engine mounting receptacles rigidly connected to the other rigid member in spaced relation, whereby an engine supported in said mounting receptacles is rigidly mounted on said upright engine supports and may be selectively pivotally positioned by adjustment of said adjustable members.

2. A stand for supporting an engine provided with mounting points comprising, a base frame, a pair of upright engine supports disposed in spaced opposed relation and secured to said frame, each upright engine support including a rigid member pivotally secured at one end to said frame and an adjustable member pivotally secured at one end to said frame in fixed spaced relationship to the pivotal connection of said rigid member to said frame, said rigid member and said adjustable member pivotally associated at a point above the pivotal connections of said members to said frame, open ended fixtures connected to said rigid members with their opened ends upwardly disposed, there being at least one ended fixture rigidly connected to one of said rigid members, and at least two open ended fixtures rigidly connected to the other rigid member in spaced relation, mounting means adapted to be secured to said engine via said mounting points and having fixture engaging portions received into the open ends of said open ended fixtures, whereby an engine supported in said open ended fixtures is rigidly mounted on said engine supports and may be selectively pivotally positioned by adjustment of said adjustable members.

3. A stand for supporting an engine as in claim 2 and including four open ended fixtures consisting of an upper and a lower fixture rigidly mounted on the rigid member of each of said pair of engine supports.

4. A stand for supporting an engine as in claim 2 and including a pair of support structures each rigidly mounted on one of said rigid members and each carrying one of said fixtures at a point displaced from the respective rigid member.

5. A stand for supporting an engine as in claim 2 and including a pair of open ended fixtures disposed in opposed relation above said frame in spaced relation to the respective rigid members, and means for supporting said additional pair of open ended fixtures above said frame.

6. A stand for supporting an engine comprising, a base frame, a pair of supporting structures disposed in spaced opposed relation on opposite sides of said frame; each of said supporting structures comprising a rigid support member pivotally secured to said frame, a longitudinally adjustable member having one end pivotally secured to said frame in fixed spaced relation to the pivotal connection of said rigid support member to said frame, said adjustable member having its other end pivotally secured to said rigid support member above the point of pivotal connection of said rigid support member to said frame, and means for adjusting the length of said adjustable member; a pair of mounting fixtures rigidly connected to each of said rigid support members in fixed spaced relation, a yoke adapted to be secured to an engine and having opposite ends disposed in two of said fixtures, said two fixtures being one on each of said rigid support members, and further means adapted for engaging said engine disposed in engagement with the other two of said fixtures, whereby an engine supported on said stand may be selectively pivotally positioned by adjustment of said adjustable members.

7. A stand for supporting an engine having a tailpipe and a propeller comprising, in combination, a base frame, a pair of upright engine supporting means disposed in spaced opposed relation and secured to said frame; each engine supporting means including a rigid member pivotally secured at one end to said frame and an adjustable member pivotally secured at one end to said frame in fixed spaced relationship to the pivotal connection of the rigid member to said frame, said rigid member and said adjustable member pivotally associated at a point above the pivotal connection of said members to said frame; a first mounting receptacle rigidly secured to one of said rigid members and a second mounting receptacle rigidly secured to the other of said rigid members, a yoke adapted to be secured to said engine and having opposite ends received into said first and second mounting receptacles, at least one additional mounting receptacle supported on said rigid members in spaced relation to said first and second mounting receptacles and spaced from an axis passing through said first and second mounting receptacles, whereby an engine may be rigidly mounted, via said receptacles, on said engine supporting means so that its weight is distributed via each of said supporting means to the base frame, and engine protection means fixed to said rigid members for extending about a portion of said engine, whereby said engine and said engine protection means may be selectively and simultaneously pivotally positioned by adjustment of said adjustable members.

8. A stand for supporting an engine as in claim 7 and wherein said adjustable members each includes mechanism for extending and retracting the length thereof for pivoting the rigid members to rotate the engine, and including a mechanism connecting said adjustable members of said supporting means for simultaneous adjustment.

9. A stand for supporting an engine as in claim 7, and including a pair of support structures each rigidly mounted on one of said rigid members, extending in one longitudinal direction from said rigid members, and each carrying a mounting receptacle at a point displaced from the respective rigid member; and wherein said engine protection means comprises a rigid engine tailpipe protection structure extending in an opposite longitudinal direction from said support structures.

10. A stand for supporting an engine as in claim 9 and wherein each of said support structures includes a pair of rods, said pair of rods joined at one end and having their opposite ends secured to opposite end portions of the respective rigid member forming a rigid triangular structure therewith; and wherein the receptacle carried by each of said support structures is carried at the joined ends of said rods.

11. A stand for supporting an engine having a tailpipe and a propeller comprising, in combination, a base frame, a pair of upright engine supports disposed in spaced opposed relation and secured to opposite sides of said frame, each support including a rigid member pivotally secured at one end to the frame and an adjustable member pivotally associated with the other end of the rigid member and pivotally secured to the frame in fixed spaced relationship to the piovtal connection of the rigid member to the frame, said adjustable members including manually operated mechanisms for extending and retracting the length thereof; and an upper and a lower open ended fixture rigidly secured to each rigid member in fixed spaced relationship, said fixtures oriented with their open ends upwardly disposed, a yoke adapted to be secured to the engine and having opposite ends received into the upper open ended fixture of each rigid member, a mounting bar adapted to be secured to the engine and having opposite ends received into the lower open ended fixture of each rigid member whereby the engine is rigidly supported on said pair of engine supports, rigid engine tailpipe protection means rigidly fixed to said rigid members for extending about the tailpipe, and mechanism connecting the adjustable members of said supports for simultaneous adjustment, whereby said rigid members may be pivoted to rotate the engine about a transverse axis to space the propeller from the ground.

References Cited in the file of this patent

UNITED STATES PATENTS

| | | |
|---|---|---|
| 1,600,835 | Manley | Sept. 21, 1926 |
| 2,583,114 | Monteith | Jan. 22, 1952 |
| 2,820,644 | Smith | Jan. 21, 1958 |
| 2,825,477 | Ross | Mar. 4, 1958 |